(12) United States Patent
Patterson

(10) Patent No.: US 9,418,411 B2
(45) Date of Patent: Aug. 16, 2016

(54) SYSTEM AND METHOD FOR SUN GLINT CORRECTION OF SPLIT FOCAL PLANE VISIBLE AND NEAR INFRARED IMAGERY

(71) Applicant: Karen W. Patterson, Alexandria, VA (US)

(72) Inventor: Karen W. Patterson, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/689,745

(22) Filed: Apr. 17, 2015

(65) Prior Publication Data
US 2015/0302567 A1      Oct. 22, 2015

Related U.S. Application Data

(60) Provisional application No. 61/982,517, filed on Apr. 22, 2014.

(51) Int. Cl.
*G06K 9/46*       (2006.01)
*G06K 9/66*       (2006.01)
(Continued)

(52) U.S. Cl.
CPC .............. *G06T 5/50* (2013.01); *G06K 9/0063* (2013.01); *G06T 7/0081* (2013.01); *H04N 5/332* (2013.01); *G06K 2009/00644* (2013.01); *G06T 2207/20172* (2013.01); *G06T 2207/20224* (2013.01)

(58) Field of Classification Search
CPC ..................... G06T 5/50; G06T 7/0081; G06T 2207/20172; G06T 2207/20224; G06K 9/0063; G06K 2009/00644; H04N 5/332
USPC .................. 382/191, 173, 254, 130
See application file for complete search history.

(56) References Cited

U.S. PATENT DOCUMENTS 5,836,872 A * 11/1998 Kenet .................. A61B 5/0059
                                                                 382/128
7,269,303 B2 * 9/2007 Miller ................ H04N 1/00209
                                                                 382/254
(Continued)

FOREIGN PATENT DOCUMENTS

KR      1020090094833         9/2009

OTHER PUBLICATIONS

Patterson, K.W., Lamela, G., "Impact of specular reflection on bottom type retrieved from WorldView-2 images", Algorithms and Technologies for Multispectral, Hyperspectral, and Ultraspectral Imagery XIX, Proc. SPIE vol. 8743, pp. 874310-1-874310-9, (May 18, 2013), (conference date Apr. 29-May 2, 2013).

(Continued)

*Primary Examiner* — Samir Ahmed
(74) *Attorney, Agent, or Firm* — US Naval Research Laboratory; Sally A. Ferrett

(57) ABSTRACT

A computer implemented method and system for reducing sunglint effects in a multispectral digital image from a satellite multiband imager having a sampling time delay between collection of a first bandset and a second bandset, each bandset including a near infrared band and a plurality of other wavelength bands. For each bandset separately, extract pixels in a window surrounding a current pixel, determine a local low glint value as the characteristic value of a small subset of pixels in the window having the lowest near infrared reflectance values, determine a near infrared glint value by subtracting the local low glint value from the near infrared reflectance value of the current pixel, and determine glint-corrected values for each of the wavelength bands by subtracting the local low glint value from each wavelength band reflectance value. A second pass can apply a near infrared band subtraction correction to all bands of the first bandset and the second bandset. The satellite imager can be the WorldView-2 or WorldView-3 system.

15 Claims, 10 Drawing Sheets

(51) Int. Cl.
*G06T 5/50* (2006.01)
*G06K 9/00* (2006.01)
*G06T 7/00* (2006.01)
*H04N 5/33* (2006.01)

(56) References Cited

U.S. PATENT DOCUMENTS

| | | | | |
|---|---|---|---|---|
| 7,491,944 | B1* | 2/2009 | Stork | G01J 3/2823 250/390.07 |
| 8,260,086 | B2* | 9/2012 | Riley | G06T 3/4061 382/100 |
| 2002/0096622 | A1* | 7/2002 | Adler-Golden | G06K 9/0063 250/208.1 |
| 2002/0126134 | A1 | 9/2002 | Willis et al. | |
| 2008/0180530 | A1 | 7/2008 | Keam | |
| 2010/0008595 | A1* | 1/2010 | Riley | G06K 9/0063 382/254 |
| 2010/0060905 | A1 | 3/2010 | Wienand | |
| 2012/0269399 | A1 | 10/2012 | Anderson et al. | |

OTHER PUBLICATIONS

Petri, G., Walker, A.S.,"Airborne Digital Imaging Technology: A New Overview", The Photogrammetric Record, vol. 22, No. 119, pp. 203-225, (Sep. 2007).

Petri, G., "Airborne Pushbroom Line Scanner, An Alternative to Digital Frame Cameras", GeoInformatics, Jan./Feb. 2005, pp. 50-57.

Doxani, G., Papadopoulou, M., Lafazani, P., Tsakiri-Strati, M., Mavridou, E., "Sun glint correction of very high spatial resolution images", Thales, in honor of Prof. Emeritus Michael E. Contadakis, pp. 329-340, (Dec. 2012).

Updike, T., Comp, C., "Radiometric use of WorldView-2 imagery," DigitalGlobe Technical Note, Rev. 1, (Nov. 1, 2010), pp. 1-17.

Miller, C. I., "Evaluation of Sun Glint Correction Algorithms for High-Spatial Resolution Hyperspectral Imagery." Masters Thesis. Naval Postgraduate School, Monterey, California, (Sep. 2012), pp. i-vi and 1-79.

Silva, D., Abileah, R., "Two Algorithms for Removing Ocean Surface Clutter in Multispectral and Hyperspectral Images", Proc. SPIE 3717, Ocean Optics XIV, Kailua-Kona, Hawaii, pp. 1-9, (Jul. 1999).

Mustard, J.F., Staid, M.I., Fripp, W.J., "A semianalytical approach to the calibration of AVIRIS data to reflectance over water application in a temperate estuary", Remote Sensing of the Environment, vol. 75, Issue 3, pp. 335-349 (Mar. 2001).

Hochberg, E.J., Andrefouet, S., and Tyler, M.R., "Sea Surface Correction of High Spatial Resolution Ikonos Images to Improve Bottom Mapping in Near-Shore Environments", IEEE Transactions on Geoscience and Remote Sensing, vol. 41, pp. 1724-1729 (Jul. 2003).

Hedley, J. D., Harbone, A.R., and Mumby, P. J., "Simple and robust removal of sun glint for mapping shallow-water benthos", International Journal of Remote Sensing, (Apr. 2005), vol. 44, pp. 2107-2112.

Lyzenga, D.R., Malinas, N.P., and Tanis, F.J., "Multispectral Bathymetry Using a Simple Physically Based Algorithm" IEEE Transactions on Geoscience and Remote Sensing, (Aug. 2006), vol. 44, pp. 2251-2259.

Goodman, J.A., Lee, Z.-P., and Ustin, S.L., "Influence of atmospheric and sea-surface corrections on retrieval of bottom depth and reflectance using a semianalytical model: a case study in Kaneohe Bay, Hawaii." Applied Optics, (Jun. 11, 2008),(posted May 2008), vol. 47, No. 28, pp. F1-F11.

Kuster, T., Vahtmae, E., and Praks, J., "A sun glint correction method for hyperspectral imagery containing areas with non-neglible water leaving NIR signal", Remote Sensing of the Environment, (Oct. 2009)(available online Jul. 2009), vol. 113, pp. 2267-2274.

Kay, S., Hedley, J.D., and Lavender, S. "Sun Glint Correction of High and Low Spatial Resolution Images of Aquatic Scenes: a Review of Methods for Visible and Near-Infrared Wavelengths", Remote Sensing, (Oct. 2009), vol. 1, pp. 697-730.

Philpot, W., "Estimating Atmospheric Transmission and Surface Reflectance from a Glint-Contaminated Spectral Image", IEEE Trans. Geosci. Remote Sens., 2007, vol. 45, Issue 2, (Feb. 2007), pp. 448-457.

Montes, M., Gao, B. and Davis, C., "NRL atmospheric correction algorithms for oceans: Tafkaa user's guide," Naval Research Laboratory Tech Memo NRL/MR/7230-04-8760 (2004), 39 pages.

Kotchenova, S., Vermote, E., Matarrese, R. and Klemm, F., "Validation of a vector version of the 6S radiative transfer code for atmospheric correction of satellite data. Part I: Path radiance", Applied Optics, vol. 45, No. 26, pp. 6763-6774 (Sep. 2006)(posted Apr. 2006).

Yuan, J. and Niu, Z., "Evaluation of atmospheric correction using FLAASH," IEEE, 2008 International Workshop on Earth Observation and Remote Sensing Applications, pp. 302-307, (Jun. 2008).

Berk, A., Anderson, G., Acharya, P., Bernstein, L., Muratov, L., Lee, J., Fox, M., Adler-Golden, S., Chetwynd, J., Hoke, M., Lockwood, R., Gardner, J., Cooley, T., Borel, C., Lewis, P. and Shettle, E., "MODTRAN5: 2006 update," Proc. SPIE 6233, 62331F, 8 pages (May 2006).

Ruddick, K., Cauwer, V. and Park, Y., "Seaborne measurements of near infrared water-leaving reflectance: the similarity spectrum for turbid waters", Limnology and Oceanography, vol. 51, No. 2, pp. 1167-1179, (Mar. 2006).

International Search Report and Written Opinion of the International Searching Authority in related application PCT/US2015/26472, Jun. 24, 2015, 9 pages.

* cited by examiner

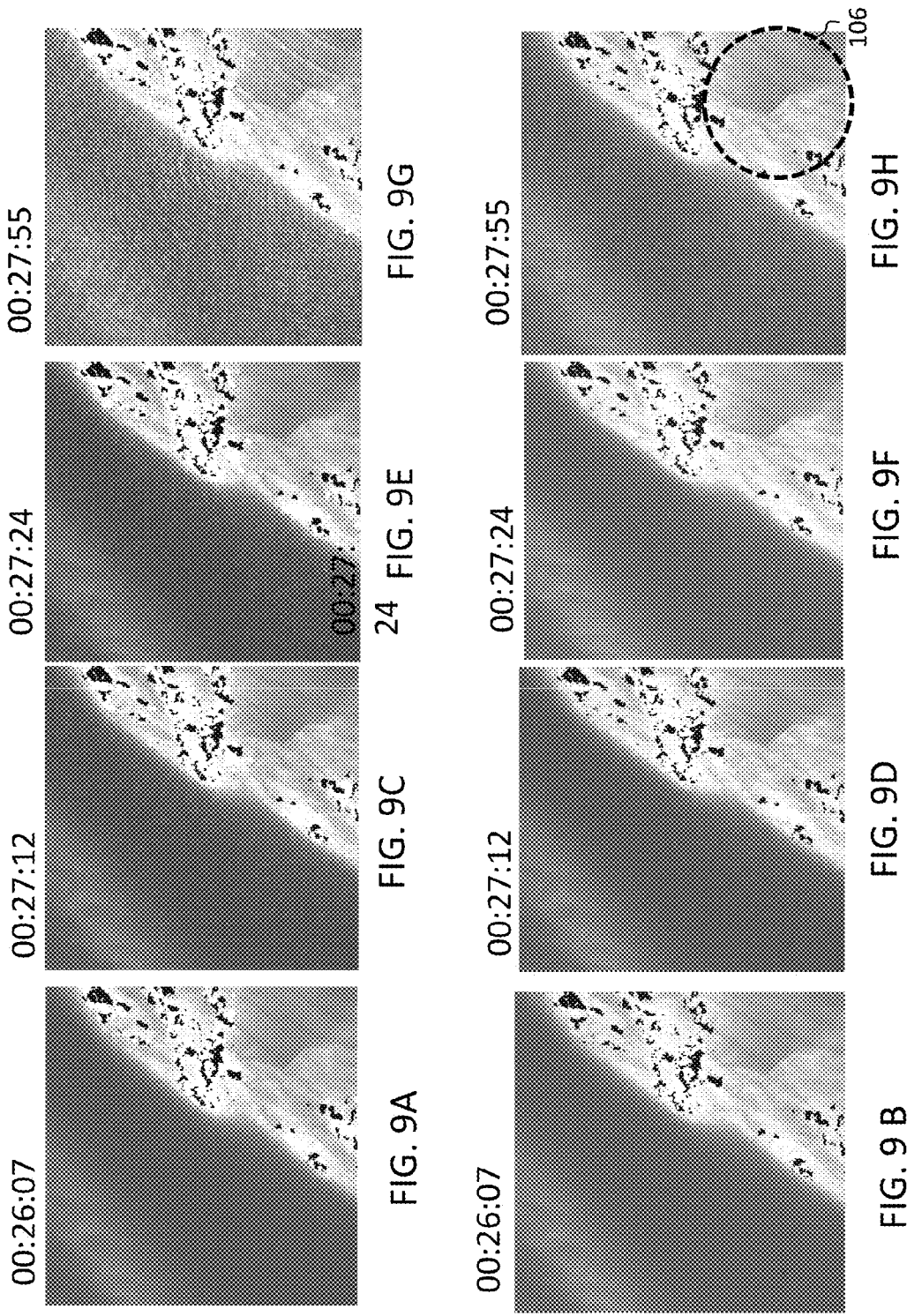

SYSTEM AND METHOD FOR SUN GLINT CORRECTION OF SPLIT FOCAL PLANE VISIBLE AND NEAR INFRARED IMAGERY

CROSS-REFERENCE TO RELATED APPLICATIONS

This application is a non-provisional under 35 USC 119(e) of, and claims the benefit of, U.S. Provisional Application 61/982,517 filed on Apr. 22, 2014, the entire disclosure of which is incorporated herein by reference.

BACKGROUND

1. Technical Field

This application is related to image processing systems and methods for multispectral imagery, and more particularly, to systems and methods for removing sun-glint from multispectral imagery.

2. Related Technology

Sunlight sensed by a satellite over coastal ocean waters includes three main elements: light scattered from the atmosphere, specular light reflected off the sea surface and light that interacted with the water column and bottom emergent from the ocean.

FIG. 1 shows how the atmosphere and water surface contribute to the radiance collected by satellite imagery. Water droplets and clouds reflect sunlight, and aerosols, ozone, and other gasses absorb sunlight, changing the total amount and spectral quality of the light reaching the ocean surface. The sunlight reflects off the sea surface as "sun glint". The sea surface acts like a mirror, so the sunlight angle of incidence equals the angle of reflection with respect to the surface normal.

In some applications, the color of the ocean itself is of interest. For example, the Naval Research Laboratory has developed a Coastal Water Spectral Toolkit to estimate water depth, bottom type and water column constituents such as chlorophyll, suspended sediments and chromophoric dissolved organic matter from the spectra of the ocean observed in hyperspectral imagery. If only images collected under optimal sun and viewing conditions, the spectral reflection and other surface effects are minimized. However, it can be useful to be able to use imagery collected under non-optimal conditions, and to remove the surface effects in post processing as much as possible.

In order to isolate the color of the ocean itself, several models exist to correct for the atmospheric component and sea glint component of the signal. Some atmospheric component models are discussed in Montes, M., Gao, B. and Davis, C., "NRL atmospheric correction algorithms for oceans: Tafkaa user's guide," Naval Research Laboratory Tech Memo NRL/MR/7230-04-8760 (2004); Kotchenova, S., Vermote, E., Matarrese, R. and Klemm, F., "Validation of a vector version of the 6S radiative transfer code for atmospheric correction of satellite data. Part I: Path radiance," Applied Optics, 45(26), 6763-6774 (2006); Yuan, J. and Niu, Z., "Evaluation of atmospheric correction using FLAASH," 2008 International Workshop on Earth Observation and Remote Sensing Applications, 302-307 (2008); Berk, A., Anderson, G., Acharya, P., Bernstein, L., Muratov, L., Lee, J., Fox, M., Adler-Golden, S., Chetwynd, J., Hoke, M., Lockwood, R., Gardner, J., Cooley, T., Borel, C., Lewis, P. and Shettle, E., "MODTRAN5: 2006 update," Proc. SPIE 6233, 62331F (2006); and Ruddick, K., Cauwer, V. and Park, Y., "Seaborne measurements of near infrared water-leaving reflectance: the similarity spectrum for turbid waters," Limnology and Oceanography, 51(2), 1167-1179 (2006). Models that correct for sea surface reflection, for multispectral visible and near infrared imagery, are discussed in Silva, D. and Abileah, R., "Two algorithms for removing ocean surface clutter in multispectral and hyperspectral images," Ocean Optics XIV, Kailua-Kona, Hawaii (1999); Hochberg, E., Andrefouet, S. and Tyler, M., "Sea surface correction of high spatial resolution Ikonos images to improve bottom mapping in near-shore environments" IEEE Transactions on Geoscience and Remote Sensing, 41, 1724-1729 (2003); Goodman, J., Lee, Z. and Ustin, S., "Influence of atmospheric and sea-surface corrections on retrieval of bottom depth and reflectance using a semianalytical model: a case study in Kaneohe Bay, Hawaii," Applied Optics, 47, F1-F11 (2008); Hedley, J., Harbone, A. and Mumby, P., "Simple and robust removal of sun glint for mapping shallow-water benthos," International Journal of Remote Sensing, 44, 2107-2112 (2005); Lyzenga, D., Malinas, P. and Tanis, F., "Multispectral Bathymetry using a simple physically based algorithm." IEEE Transactions on Geoscience and Remote Sensing," 44, 2251-2259 (2006).

BRIEF SUMMARY

A computer implemented method for reducing sunglint effects in a multispectral digital image from a satellite multiband imager having a sampling time delay between collection of a first bandset and a second bandset, each bandset including a near infrared band and a plurality of other wavelength bands. Initially mask land areas and areas obstructed by clouds or other objects in the in the multispectral digital image. Using the first bandset reflectance values, for each unmasked pixel in the image, extract pixels in a window surrounding a current pixel, determine a local low glint value as the characteristic value of a small subset of pixels in the window having the lowest near infrared reflectance values, determine a near infrared glint value by subtracting the local low glint value from the near infrared reflectance value of the current pixel, and determine glint-corrected values for each of the wavelength bands by subtracting the local low glint value from the reflectance value of each of the other wavelength bands. Using the second bandset reflectance values, for each unmasked pixel in the image, extract pixels in a window surrounding a current pixel, determine a local low glint value as the characteristic value of a small subset of pixels in the window having the lowest near infrared reflectance values, determine a near infrared glint value by subtracting the local low glint value from the near infrared reflectance value of the current pixel, and determine glint-corrected values for each of the wavelength bands by subtracting the local low glint value from the reflectance value of each of the other wavelength bands. Store, for each pixel, the near infrared glint values and the glint-corrected values for each of the wavelength bands in both the first bandset and the second bandset. In an optional second pass, apply a near infrared band subtraction correction to all bands of the first bandset and the second bandset for all the unmasked pixels. Store, for each pixel, all corrected reflectance values in a computer data file.

BRIEF DESCRIPTION OF THE DRAWINGS

FIG. 9A-9H shows the effect of the deglinting process for a shallow water subset of FIG. 7B) for four WorldView-2 images.

DETAILED DESCRIPTION

Figure 1:
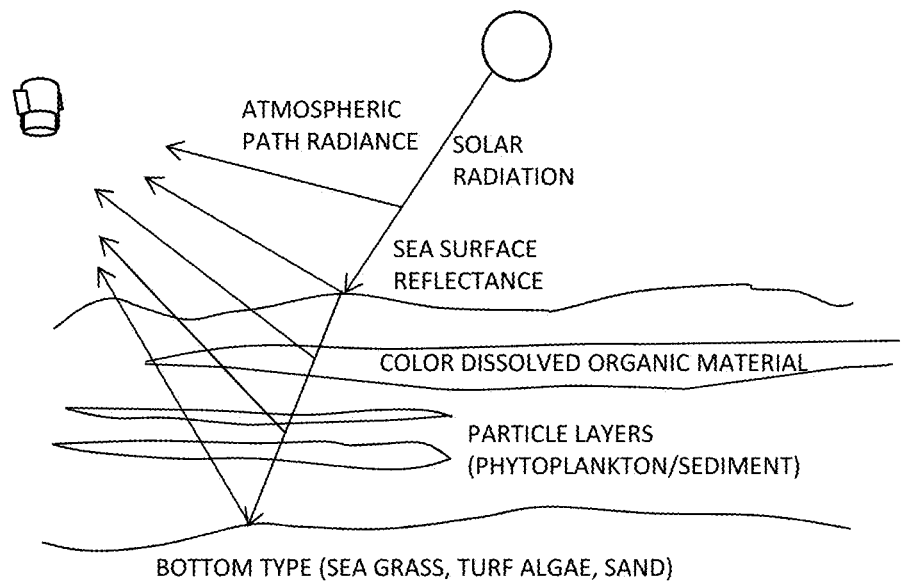
FIG. 1 illustrates some components of radiance received by an imaging system.
Figure 2:
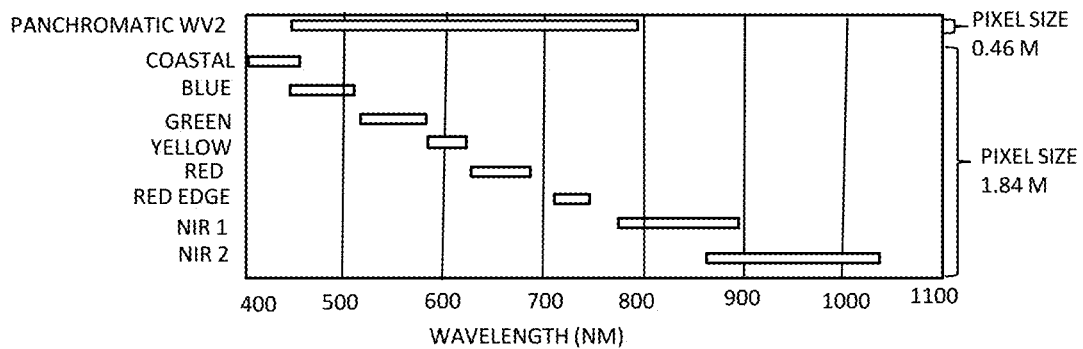
FIG. 2 shows the WorldView-2 spectral band coverage.
Figure 3A:
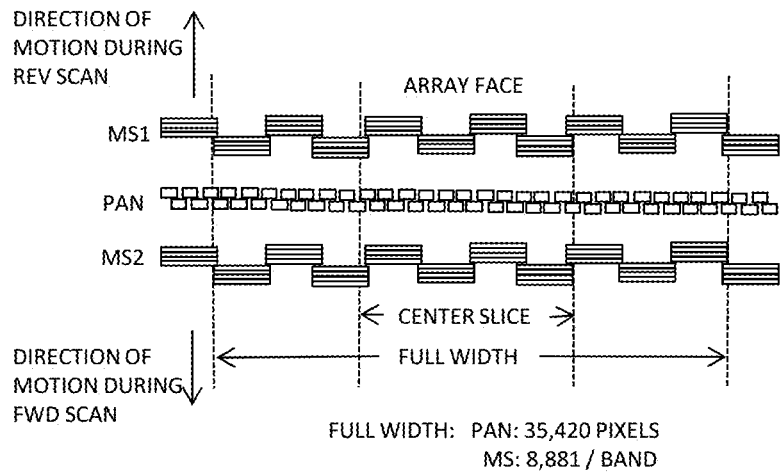
FIG. 3A shows the WorldView-2 sensor configuration.
Figure 3B:
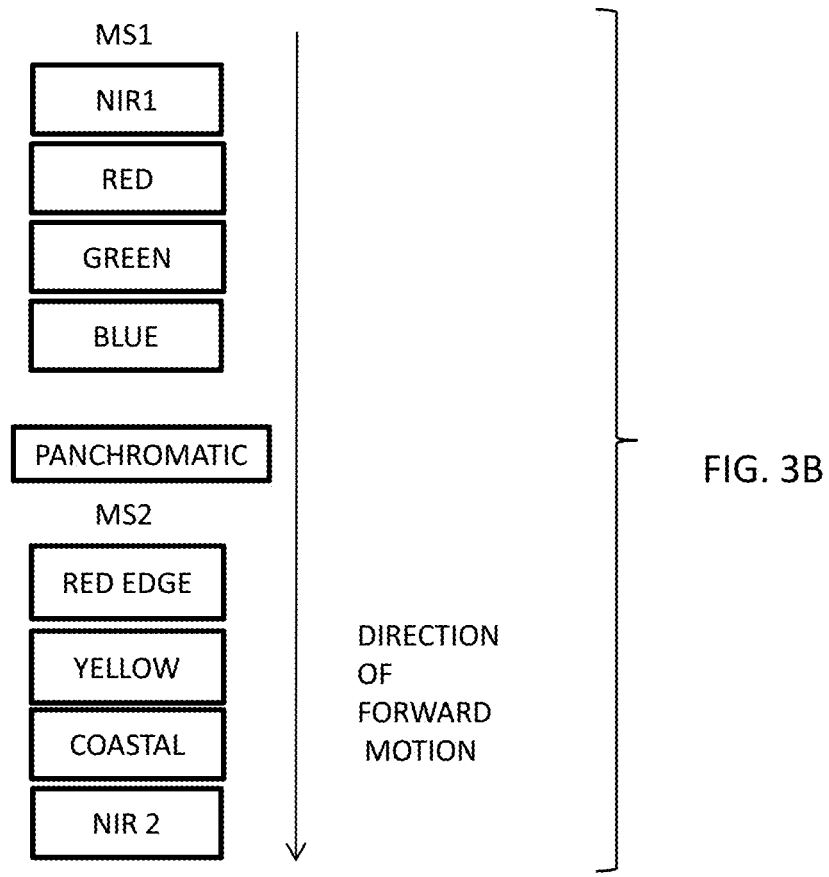
FIG. 3B shows the order in which the imagery bands are collected as the sensor moves in a forward direction.

Recently, multispectral imaging sensors were launched into orbit for the purpose of collecting multispectral imagery of the earth. The Worldview-2 satellite was launched in 2009, and is currently operated by DigitalGlobe. The WorldView-2 satellite provided the first multispectral satellite imaging capability with spatial resolution less than 2 meters and 8 bands spanning the visible and near infrared suitable for coastal water applications. The bands are red, green, blue, near-infrared (NIR), coastal, yellow, red edge, and a second near-infrared band (NIR2). Both the Worldview-2 and the Worldview-3 sensors have a split band set configuration with a 0.2 second time offset. FIG. 2 shows the WorldView-2 spectral band coverage. FIG. 3A shows the sensor configuration. A panchromatic band covers the visible wavelength range with a pixel size (spatial resolution) of 0.46 meters at nadir. The two MS bands are the multi-spectral bands and are collected with a pixel size (spatial resolution) of 1.84 meters at nadir. The bands are numbered from 1-8 according to their position on the focal plane from top to bottom on the lower left graph. As satellite moves in its normal orbit, the sensor moves in a forward direction, with the WorldView-2 MS 1 bands (NIR, Red, Green and Blue) collected first, followed by the panchromatic band, then the MS2 bands (NIR2, RedEdge, Yellow and Coastal), as seen in FIGS. 3A and 3B. There is a slight viewing angle difference between MS1 and MS2 collection and a 0.2 second time difference between collection of the MS1 and MS2 bands. The WorldView-3 multi-spectral bands have a similar sampling time delay and a 1.24 meter spatial resolution.

If the ocean surface is perfectly flat then the satellite can be tasked to avoid sun glint. However the ocean surface is very rarely flat. It is in constant motion with waves and swell which vary the vertical line perpendicular to the ocean surface reference in modeling the sun glint geometry. The constant motion of the ocean surface causes the reflected sun glint patterns to change during the 0.2 second time lapse between MS1 and MS2 collection. With spatial resolution less than 2 meters, WorldView-2 images often include wave patterns with associated highly variable sun glint patterns.

In the forward mode, the MS-1 pixels are sampled first, and the MS-2 pixels are sampled after a 0.2 second time delay. The pixel size of the new Worldview-2 and Worldview-3 sensors is smaller than the size of the ocean waves, so because the ocean surface changes height and angle during the sampling time delay, the sun glint that is picked up by the MS-2 pixels can be very different than the sun glint picked up by the MS-1 pixels 0.2 seconds later. Thus, there can be a different amount of glint in the same pixel for the different spectral bands.

Figure 4:
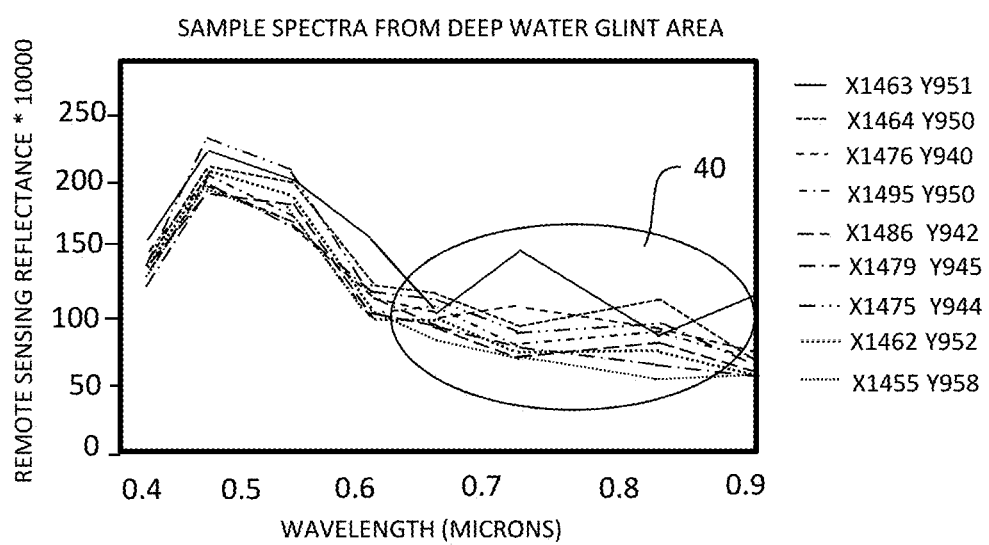
FIG. 4 shows the spectra for several pixels in a WorldView-2 image of an ocean region with homogeneous deep water and sun glint.

The inventors have appreciated that passing the split band set imagery through a computer processor that attempts to correct the image using a single band NIR subtraction method does not correct the spectral anomalies (sun glint). FIG. 4 shows the spectra for 9 pixels in a WorldView-2 image of an ocean region with homogeneous deep water and sun glint. The erratic spectral behavior in the longer wavelength region 40 shows how collecting MS1 and MS2 bandsets with a 0.2 second time difference can change the spectral shape of the reflected radiance under changing glint conditions.

Figure 5:
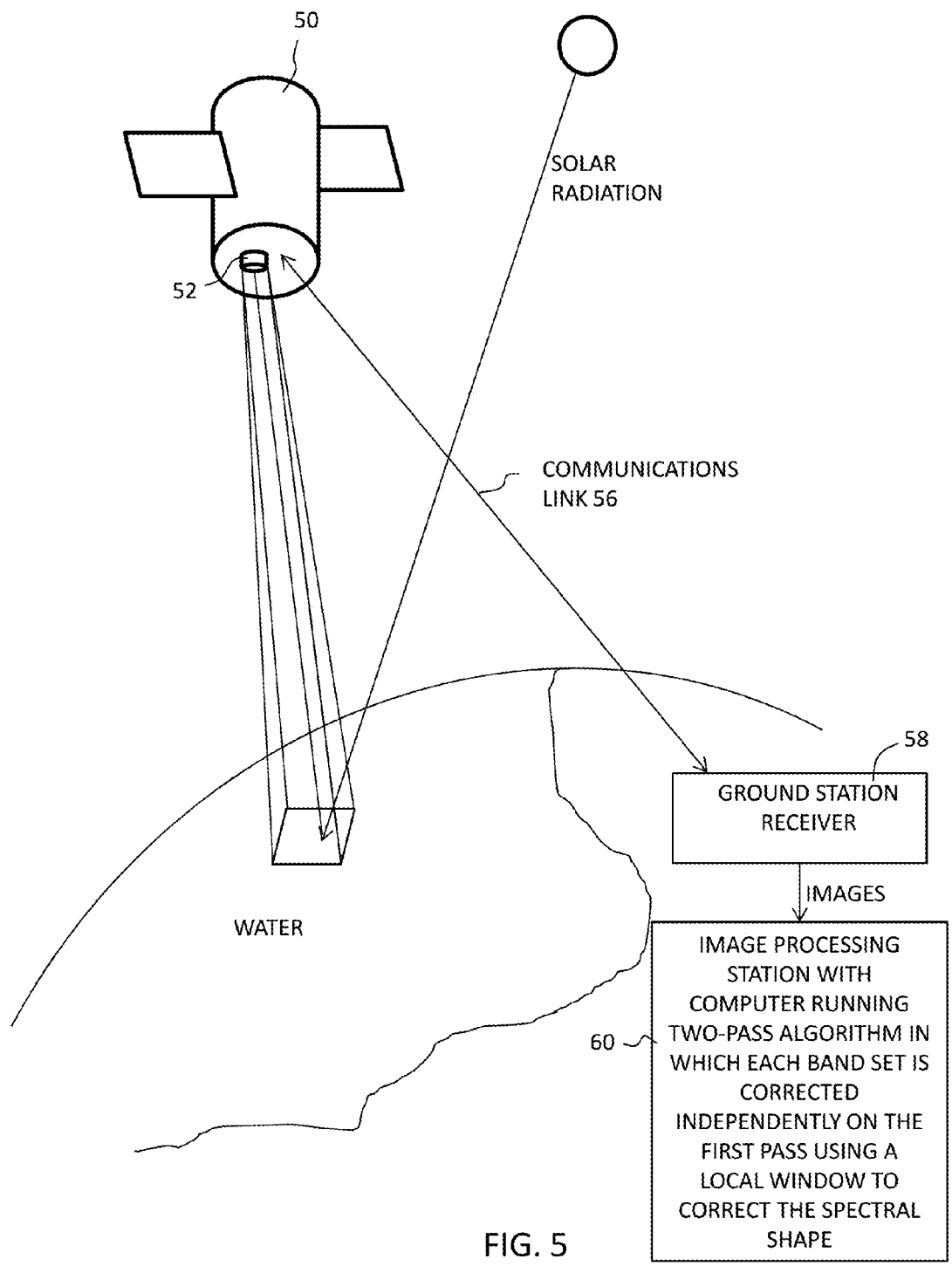
FIG. 5 shows an example of a system for collecting and correcting split focal plane visible and near infrared imagery in more detail.

FIG. 5 shows an example of a system for collecting and correcting split focal plane visible and near infrared imagery in more detail. The satellite 50 collects reflected radiation from the earth's ocean surface with a split band imaging system 52, and transmits the imagery to a ground station 58 via a communications link 56. An image processing station 60 with a computer implemented glint correction method independently corrects each band set on the first pass using a local window to correct the spectral shape. A second pass can be subsequently applied to all bands using a single band NIR subtraction method to correct for magnitude offsets.

The image processing station 60 can be located at the ground station 58 that receives imagery from the satellite. Alternatively, the image correction process can be accomplished at an image processing station 60 at another location using imagery received from the satellite ground station or from an intermediary.

Figure 6A:
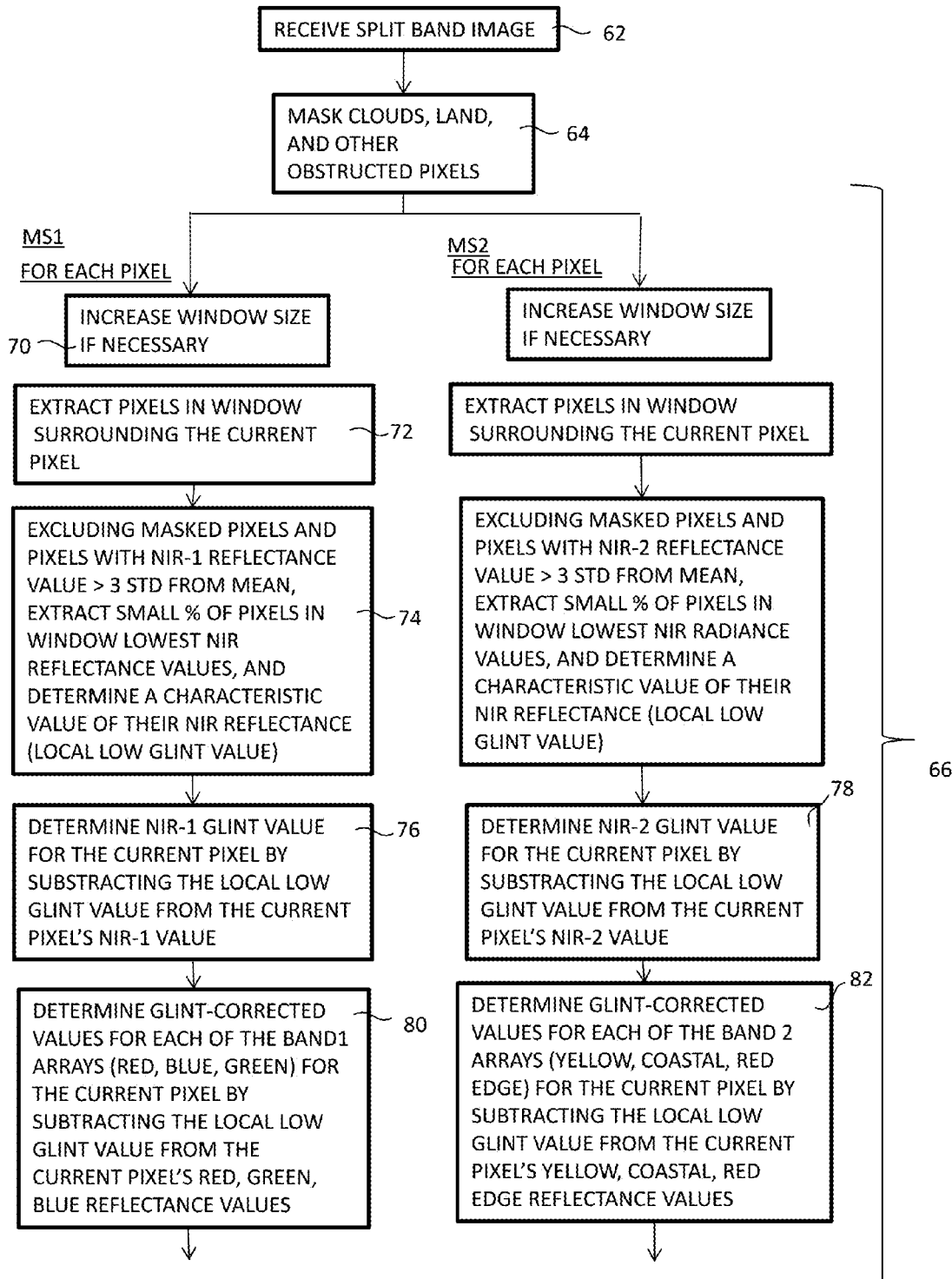
FIGS. 6A and 6B show an exemplary computer implemented method for reducing the sun glint from images from imagery that has a non-zero sampling time lapse between collection of the bands from a split band imager.
Figure 6B:
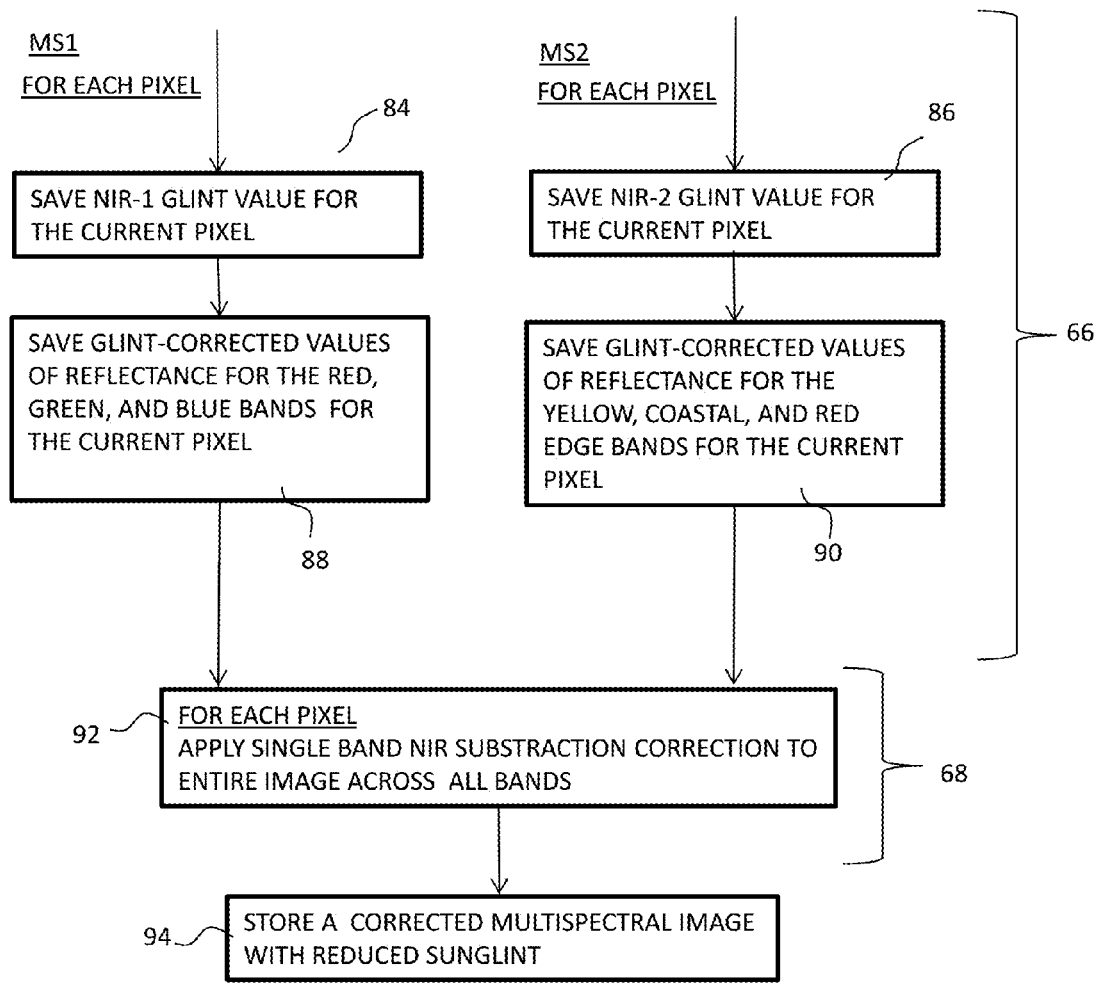

FIGS. 6A and 6B shows an exemplary computer implemented method for reducing the sun glint from images from imagery that has a non-zero sampling time lapse between collection of the bands from a split band imager. The process is primarily accomplished by a computer processor with executable instructions that operate autonomously, or that can receive user input for some of the steps in the process, as discussed below. In an exemplary embodiment, the received multispectral imagery 62 from the split band sets is corrected with two passes 66 and 68, in which each band set is corrected independently on the first pass 66 using a local window to correct the spectral shape. The first pass algorithm makes use of the small spatial resolution of the imaging sensors, allowing a wide range of wave and swell induced glint to be observed over a small area. A single band NIR subtraction method is then optionally applied to the entire image in a second pass 68 to correct for magnitude offsets.

Initially, at step 62, begin with an image from the multi-band sensor. The image can be a calibrated radiance or reflectance image, before or after atmospheric correction. In particular, the WorldView-2 imagery is delivered with the spectral radiance stored for each band.

The WorldView-2 images typically are datafiles that are radiometrically corrected image pixels ($q_{pixel,\,band}$), with the q referring to photon count in a band for a pixel. Their values are a function of how much spectral radiance enters the telescope aperture and the instrument conversion of the radiation into a digital signal. For more information, see T. Updyke, Technical Note, Radiometric Use of WorldView-2 Imagery, Digital Globe, 2010-11-01, the entire disclosure of which is incorporated herein in its entirety. The values stored in the image file will typically be integer values, with a multiplication factor (e.g., 10000) applied to all the values. The multispectral digital image is typically provided in an electronic file in a GeoTIFF or National Imagery Transmission Format (NITF) format. These electronic files include the image data in binary file format, and at least one other file with information about the image file (e.g., geolocation information). If the imaged area is very large, the imagery may delivered in several smaller files (tiles), each of which is a standalone GeoTIFF or NITF format file. The method described herein can be applied independently to these smaller image files.

This method is suitable for use with WorldView-2 or WorldView-3 imagery that has been resampled with nearest neighbor type resampling, but is not very useful for cubic convolution pan sharpened images currently available from Digital Globe, because the cubic convolution process loses some of the NIR information necessary for the de-glinting correction described below. As described in the Updyke Technical Note discussed previously, pan-sharpened products may apply non-linear transforms to the pixel DN values.

Depending on the size of the imaged area, the image can contain many files, each of which is an electronic file with imagery.

The method can also be applied to imagery before atmospheric correction, in which the received solar energy L received at a pixel is called "radiance", or to imagery to which atmospheric correction has been applied, in which it is called "reflectance", with the same units. The method could also be applied to the imagery data raw detector data $P_{det,\ band}$. For convenience the term "reflectance" will be used, however, the method can be applied to imagery data in any of these formats and units, and "reflectance" is intended herein to broadly refer to any of these formats and units.

Figure 7A:
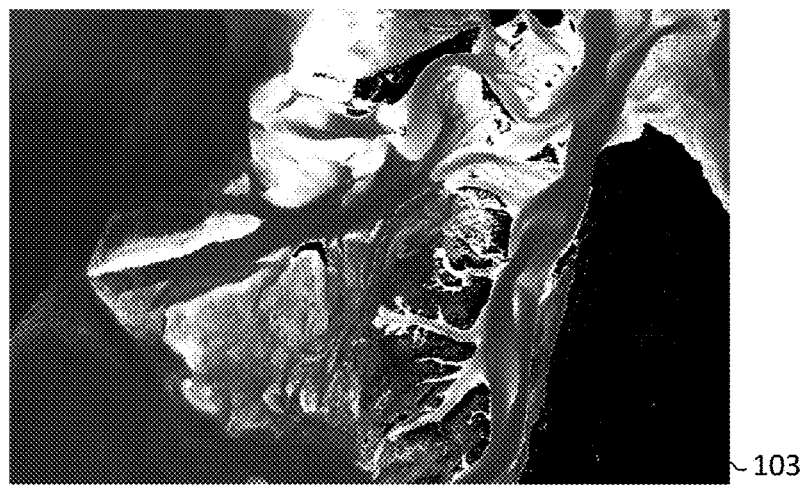
FIGS. 7A and 7B show two WorldView-2 images of the same region taken at different times, before the deglinting technique is applied.
Figure 7B:
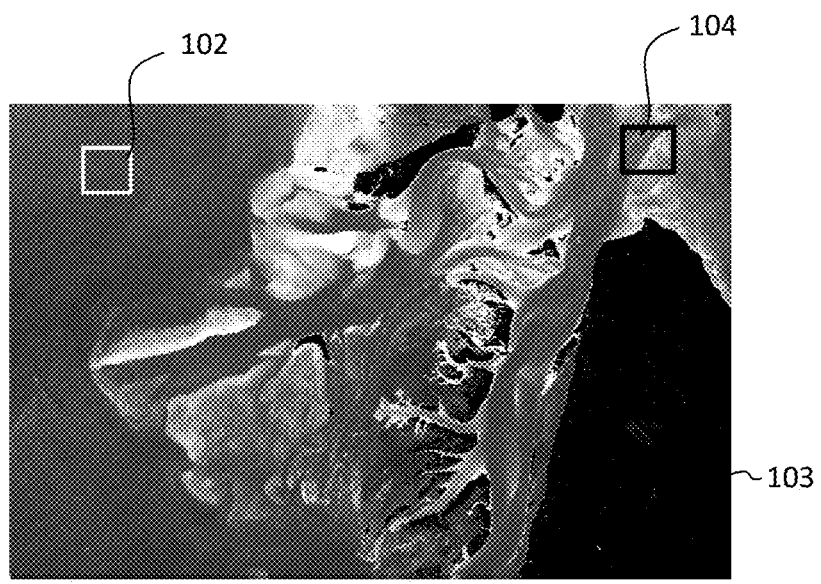

The imagery can be masked 64 to remove cloud, land, ships, or other objects and cloud shadows. In FIGS. 7A and 7B, the black area 103 is land that has been masked. Masking these objects or areas can be accomplished by a set of computer instructions executing on the computer processor without human input. By "masking", it is meant that zero or null values are assigned as the values for all bands of the masked pixels. Alternatively, a person can identify the areas of the image to be masked at a workstation or input device of the computer system. In such an example, the computer processor receives input from the user as to which areas to mask, and assigns the zero or null values to those pixels.

Next, the image is split into separate band sets based on the sensor characteristics. For example, and as discussed above, WorldView-2 has two band arrays, MS-1 and MS-2, each having four bands, with MS-1 and MS-2 physically separated in the focal plane array by the panchromatic band array. The images from the MS-1 bands are processed separately than the images from the MS-2 bands. For a sensor with more than two bandsets, additional parallel processing steps can be included to process the additional bandsets (not shown).

A moving window is used to traverse the images. For each pixel, a window of a preset size surrounds the pixel, and statistical analysis is performed on the pixels in the window. In particular, for a window surrounding a pixel, only non-masked pixels are considered, and only pixels having a reflectance value within a predetermined statistical distance from the mean or median are considered. The window size can be selected, and expanded 70 if necessary, to ensure that there are sufficient available pixels to perform statistical analysis, as follows.

Window Size

An appropriate moving window size is determined using the NIR band from each array (e.g., NIR-1 from MS-1 and NIR-2 from MS-2). The window size should be selected to create windows that have enough pixels to perform statistical analysis and preferably, that have a good mix of bright and dark pixels. A suitable value for the window size in many applications is about +/−15 pixels, which will create a moving window of 31 pixels by 31 lines (961) centered on the pixel of interest. Recall that the resolution of the WorldView-2 multispectral bands is approximately 1.84 meters, so the moving window for a WorldView-2 image will correspond to an area on the earth that is approximately 57 by 57 meters at nadir, and this size is likely to include both bright and dark pixels.

For pixels near the edges of the image and in the vicinity of any masked pixels, the window size can be expanded 70 to retain a suitable sampling of the glint distribution, so that there are enough pixels in the window for statistical analysis and preferably, so there are both bright pixels and dark pixels. The window near the edge of an image or near a masked area can be expanded until the number of pixels available in the window for calculation of statistics is at least a threshold value (e.g., 95%) of the number of pixels in the user-specified window size. Thus, for a selected window size of 31 pixels by 31 lines (961 total pixels), 95% of 961 is 913 pixels, the window might be increased by one or more pixels in each direction until the number of non-masked pixels in the window equals or exceeds 913 pixels.

The computer instructions can include a preset or default value for window size, and can optionally receive input from a user to use a different window size instead of the default value.

First Pass Correction of Sun Glint

For each non-masked pixel in the image, executable instructions on the computer processor perform statistical analysis of the window surrounding that pixel. In one example, the following steps are performed for each pixel in the image.

(a) Determination of Local Glint Minimum Value for Window:

The local window for the pixel of interest is extracted 72 from the entire image and the location of the pixel of interest within the window is recorded. In one example, window size is set as 31 by 31 pixels, or 961 total pixels, and in the regions near an edge or masked area, the window is expanded until there are at least 913 available pixels (95% of 961 pixels).

As shown at steps 74 and 75 of FIG. 6A, in an exemplary embodiment, the mean and the standard deviation of the NIR radiance or reflectance values for a window are computed, using only the unmasked pixels. Pixels having NIR radiance or reflectance values outside three standard deviations from the mean can be considered outliers and can also be excluded from consideration. Such outlier pixel NIR values will often be due to bits of clouds and cloud shadows that were missed in the masking step. It is noted that the outlier pixel NIR-1 values can optionally be included when determining the mean and standard deviation for a window, however, including these outlier pixels can degrade the results.

For each of the near infrared bands (NIR-1 and NIR-2 in MS1 and MS2, respectively), considering each NIR band separately, extract a small number of pixels in the window that have the lowest NIR values. For example, in step 74 for MS1, consider only the NIR-1 values, and in step 76 for MS2, consider only the NIR-2 values. The number of pixels can be approximately 1% of the pixels in the window with the lowest NIR values, excluding pixels having values outside three standard deviations from the mean and excluding any masked pixels. In an example in which the window size is 31 pixels× 31 lines, the window has 961 total pixels. Since 1% of 961 pixels is 9.61 pixels, this value can be rounded to 10 pixels, so the lowest 10 pixels are extracted.

The number of pixels with the lowest NIR values could be a different small subset of the pixels. By small, it is meant that it might be suitable to use 1% or 2% of the pixels in the window with the lowest NIR values, or even up to about 5% of the pixels. It is believed that 5% may be an upper limit for most WorldView-2 imagery, because it may exclude useful data that is not glint-related. Alternatively, the number of low-NIR value pixels to be extracted can also be a predetermined integer value that is used regardless of window size. Alternatively, if the number of low NIR-value pixels to be extracted is calculated as a percentage of the number of pixels in the window, and the result is non-integer, other methods of finding the integer number can be used, for example, truncation of the non-integer portion. In the example above of a window having 961 pixels, truncation would lead to 9 pixels being extracted.

The computer program then calculates a characteristic value or statistical value (e.g., the minimum, mean, or median) of the extracted lowest-value pixels in the window for each of the near infrared bands. In some embodiments, the computer executable instructions have preset a specific one of the mean, median, or minimum as the choice of characteristic value. Alternatively, the computer instructions can receive a user selection that identifies which characteristic value is to be used. For example, the user can select the mean, median, minimum, or another value. Some factors that can be used to determine statistical value to use are the glint characteristics of the image and the window size.

The resulting statistical value (one for each of the NIR bands, NIR-1 and NIR-2) is designated as the local glint minimum value (called the local low glint value or "no glint" value) for a infrared band in the window and is stored in computer memory for later use.

(b) Determine the NIR Glint Value for Each of the NIR Bands:

At step 76 of FIG. 6A, for NIR-1 array, the computer implemented instructions compute the NIR glint value for the current pixel by subtracting the stored NIR-1 local low glint value (the "no glint" value) for the window around the pixel from the current pixel's NIR-1 reflectance value. For NIR-2 array at corresponding step 78 in the parallel analysis of the MS2 band, compute the NIR-2 glint value for the current pixel by subtracting the stored NIR-2 local low glint value (the "no glint" value) for the window around the pixel from the current pixel's NIR-2 reflectance value.

(c) Correct the Reflectance for the Other Subbands in Each Multispectral Array:

At steps 80 and 82, and processing the MS-1 and MS-2 arrays separately, for the current pixel, subtract the NIR glint value from the radiance value for the pixel in each of the other bands in the array. For example, subtract the NIR-1 glint value for a pixel from the value of each of the other bands in the MS-1 array (red, green, blue). Subtract the NIR-2 glint value for the current pixel from the reflectance value for the pixel in each of the other bands in the MS-2 array (red edge, yellow, coastal).

This process is repeated for each of the pixels in the image. As seen at elements 84, 86, 88, and 90 of FIG. 6B, the NIR-1 and NIR-2 glint values and the corrected reflectance values for the other six bands in the two arrays are stored for each pixel, essentially combining the separately corrected MS-1 and MS-2 band array data to form an eight-band multispectral image with local area sun glint removed.

This process can provide an image data file that includes corrected imagery with reduced sun glint in each band. The corrected image data file can be electronically stored in an Environment for visualizing Images (ENVI) binary file, although other file formats may also be suitable. ENVI binary files are useful for multispectral image data, and have a generalized raster data format with two parts: the flat binary file ('.bsq', '.bil' or '.bip' extensions), and a header file ('.hdr' extension), which is a text (ASCII) file containing the metadata associated with the binary file. ENVI is a registered trademark of Exelis, Inc., which produces a suite of commercially available geospatial software.

Second Pass Correction of Sun Glint Across all Bands in Both Multispectral Arrays:

As shown at element 92 of FIG. 6B, a second pass can be subsequently applied to all bands using a single band NIR subtraction method to correct for magnitude offsets.

Note that in deep water, the 908 nm value (NIR-2) should be essentially zero. However, there may be an image-wide residual due to glint or inadequate atmospheric correction that can optionally be removed. One approach is to subtract the minimum 908 nm value (NIR-2) found in deep water from all the pixels in the image, over all MS1 and MS2 bands.

This creates a corrected eight-band multispectral image with local area sun glint removed in two passes, the first pass corrections being determined separately and applied separately to the MS1 and MS2 bands, and the subsequent pass correction being applied to all the bands in MS1 and MS2. The image file is stored 94 for later use. As discussed above, the resulting image data file can be electronically stored in an ENVI format binary data file.

The process shown in FIGS. 6A-6B and described above is effective in reducing glint for imagery that has a non-zero sampling time lapse between collection of the bands from a split band imager. It could also be applied to images from imaging systems with a smaller or larger sampling time lapse than the 0.2 second delay of the WorldView-2 system. The system described herein is particularly effective for images from imaging systems with both high resolution (small pixels) and a sampling time delay between collection of the bands, because the high resolution and the time delay produce spectral anomalies that are not corrected by previous glint correction techniques.

The steps described herein, and shown in at least FIG. 6A-6B can be entirely accomplished with a computer processor without user input. Optionally, the instructions can allow input from a user for various parameters such as window size.

EXAMPLES

As the WorldView-2 orbits the earth, it collects a few images of the same area, or a few more if sensor is steered to point toward a particular earth location.

In the following example, seven WorldView-2 images of the Moreton Bay, Australia area were collected between 00:26-00:28 GMT on 10 Jun. 2011 with a multi-spectral pixel resolution of about 2 meters. A summary of the solar and sensor viewing conditions are shown in Table 1, annotated with the minute and second the image was collected (e.g., the image collected at 00:26:07 GMT is labeled as 2607). Images were delivered in three tiles divided in the latitudinal direction. The images were preprocessed so the same pixel and line location represented the same patch of water in all of the images. In particular, the images were warped and cropped to match the 2659 image using clearly identifiable ground control points and nearest neighbor resampling so as not to alter the spectra.

TABLE 1

| Image Time (GMT) | 00:26:07 | 00:26:59 | 00:27:12 | 00:27:24 | 00:27:30 | 00:27:42 | 00:27:55 |
|---|---|---|---|---|---|---|---|
| Solar Zenith | 53.9 | 53.9 | 53.8 | 53.8 | 53.8 | 53.8 | 53.8 |
| Solar Azimuth | 22.8 | 22.6 | 22.5 | 22.5 | 22.5 | 22.4 | 22.4 |
| Sensor Zenith | 38.1 | 23.8 | 22.8 | 23.6 | 25.2 | 28.2 | 31.9 |
| Sensor Azimuth | 338.5 | 298.8 | 282.8 | 266.6 | 255.5 | 243.7 | 234.7 |

FIGS. 7A and 7B show two of the images in the green band at 00:26:59 GMT and 00:27:55 GMT, respectively. These are the low glint and high glint images in the series of seven images. In FIG. 7B the rectangle 102 outlines the deep water subset shown in detail in FIGS. 8A and 8B and the rectangle 104 outlines the shallow water subset shown in detail in later figures.

Figure 8A:
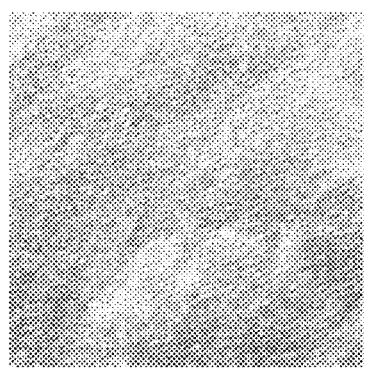
FIG. 8A is a full resolution image of a deep water subset of FIG. 7B before deglinting.
Figure 8B:
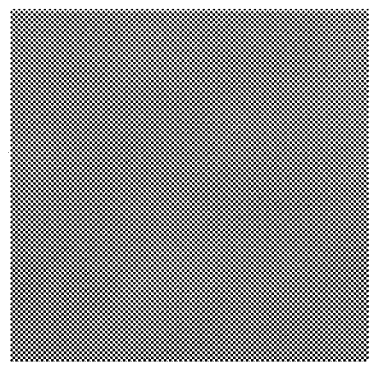
FIG. 8B shows the same image after deglinting using the process shown in FIGS. 6A and 6B, and FIGS. 8C and 8D each plot the spectra extracted from the images of the deep water subset of FIG. 7B for nine different pixels.
Figure 8C:
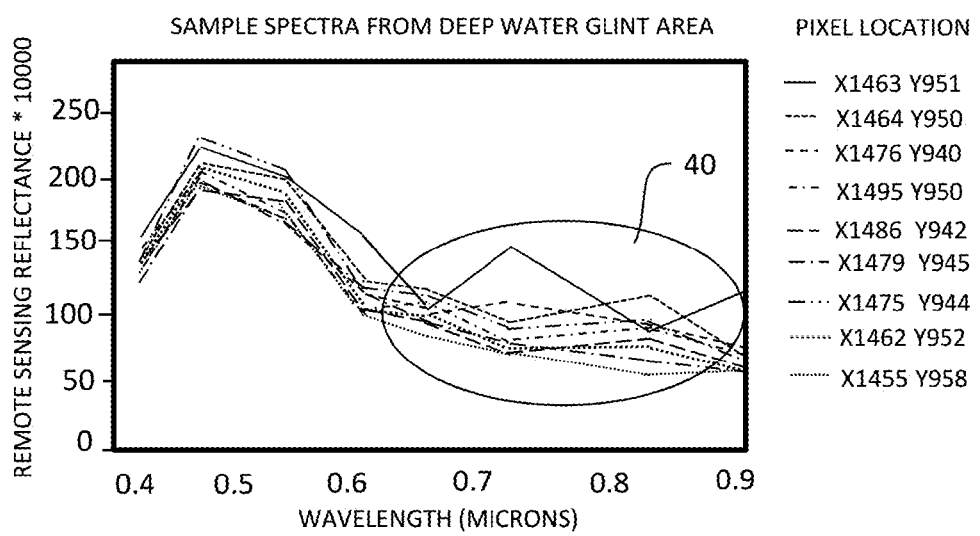
Figure 8D:
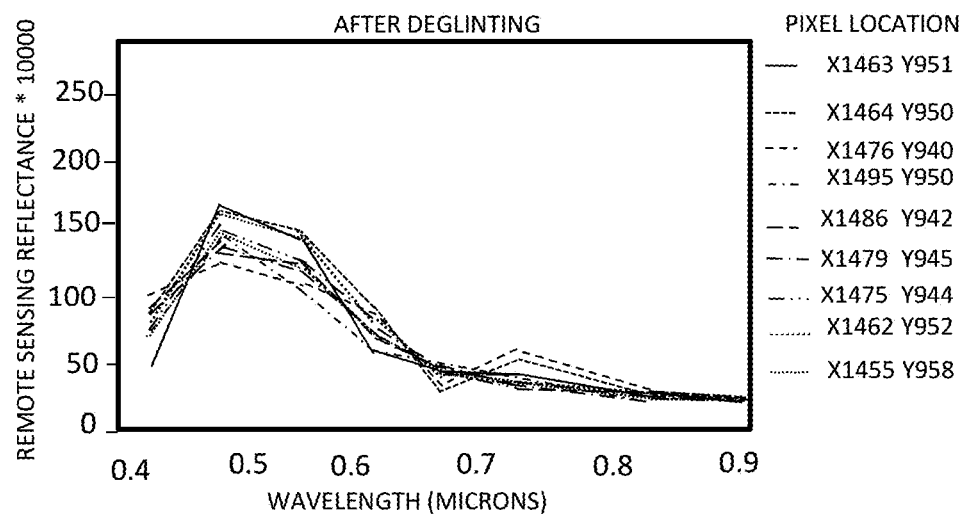

FIG. 8A is a full resolution image of the deep water subset of the 2755 image in the FIG. 7B box 102 before deglinting, and FIG. 8B shows the same image after deglinting using the process shown in FIGS. 6A-6B and discussed above. Each image is 400 pixels by 400 lines and is centered on pixel 1463, line 951 in the larger image. FIGS. 8C and 8D each plot the spectra (spectral reflectance versus wavelength of the imaging sensor bands) extracted from the images for nine different pixels shown by their x and y coordinates.

As seen in FIG. 8B, the sun glint has been greatly reduced, which is apparent by the more regular shape of the long wavelength band spectra in FIG. 8D.

FIG. 9A-9H shows the effect of the deglinting process for the shallow water subset (the region shown in the boxed area 104 of FIG. 7B), for four WorldView-2 images of the Moreton Bay, Australia area collected on 10 Jun. 2011, at times 00:26:07, 00:27:12, 00:27:24, and 00:27:55. Note the significant reduction in glint in the images (FIGS. 9B, 9D, 9F, and 9H) corrected with the process shown in FIGS. 6A-6B and discussed above and particularly the reduction in the deglinted image of FIG. 9H. However, it is seen that the wave shadows are apparent in each of the deglinted images. See, for example, the circled area 106 in FIG. 9H, in which the wave shadows appear as darker areas. In this example, it is noted that because the local low glint value substracted from the pixel reflectance values in the first pass may not be the absolutely lowest value of NIR reflectance within the window, pixels that include surface wave shadows will have a little light added to them, reducing or eliminating the wave shadows on the surface. The shadows on the sea floor may remain because the refraction of light at the air/water interface redirects the shadow on the seafloor to a different location in the image whose pixels are not as completely corrected as the surface wave shadow pixels.

Figure 10A:
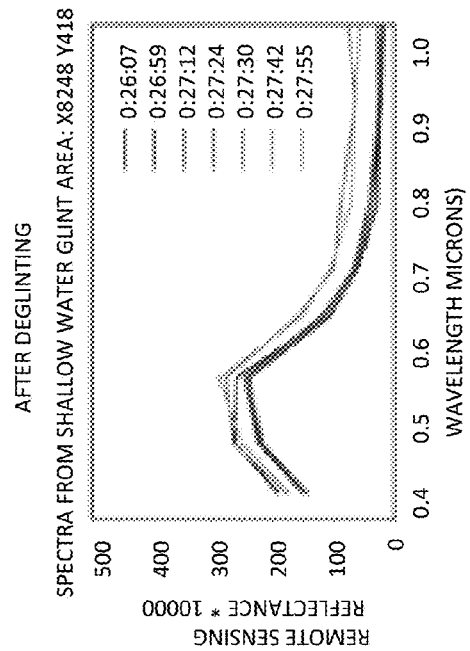
FIG. 10A-10H show the spectra for four different pixels in the shallow water glint areas of FIG. 7B before and after deglinting according to an embodiment of the invention.
Figure 10B:
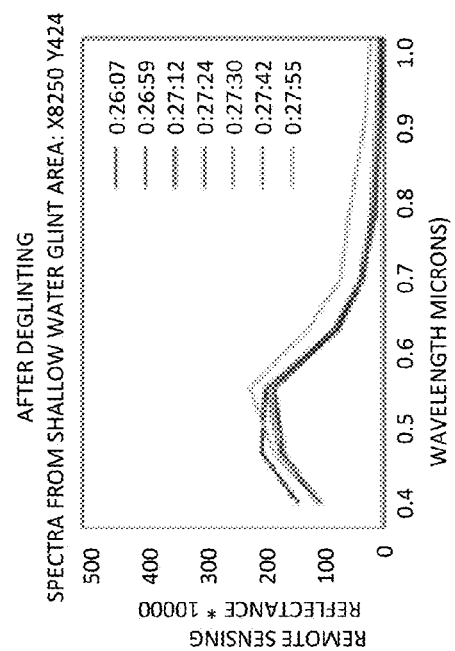
Figure 10C:
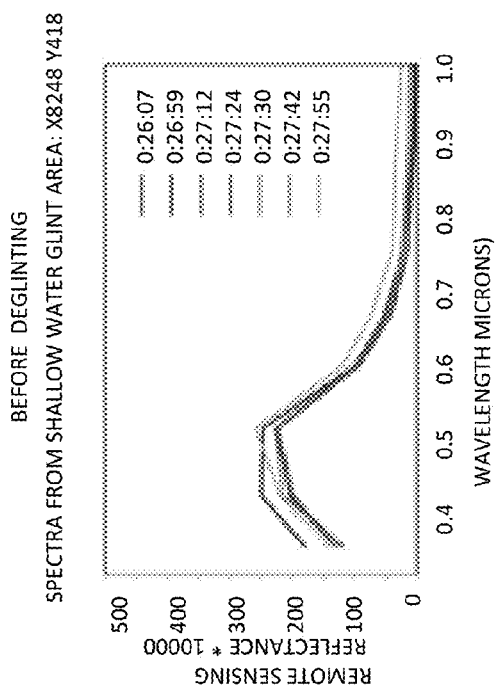
Figure 10D:
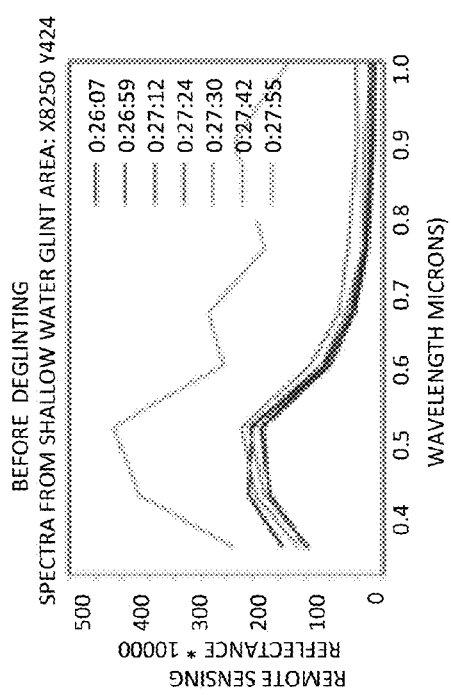
Figure 10E:
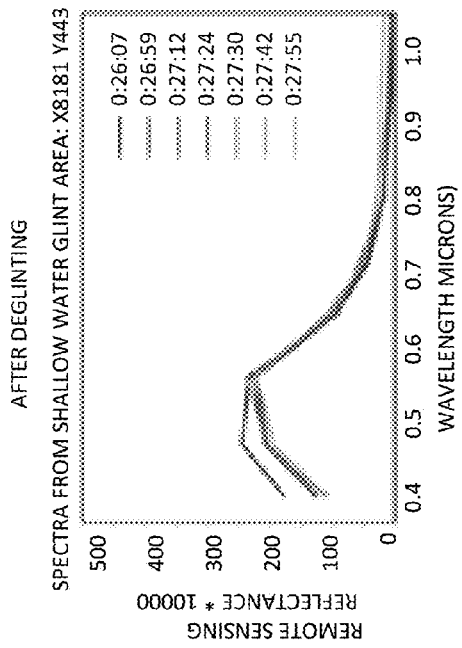
Figure 10G:
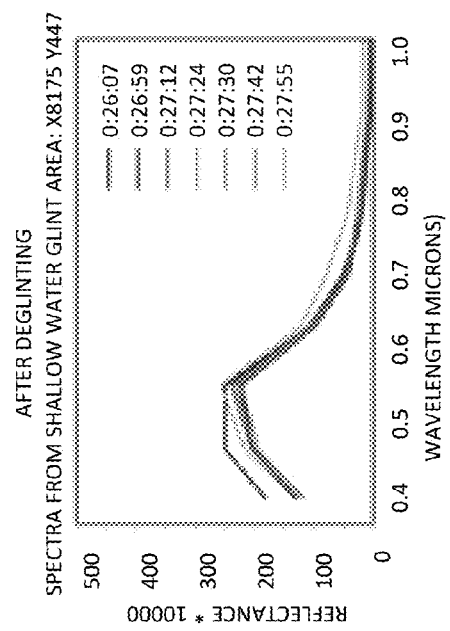
Figure 10F:
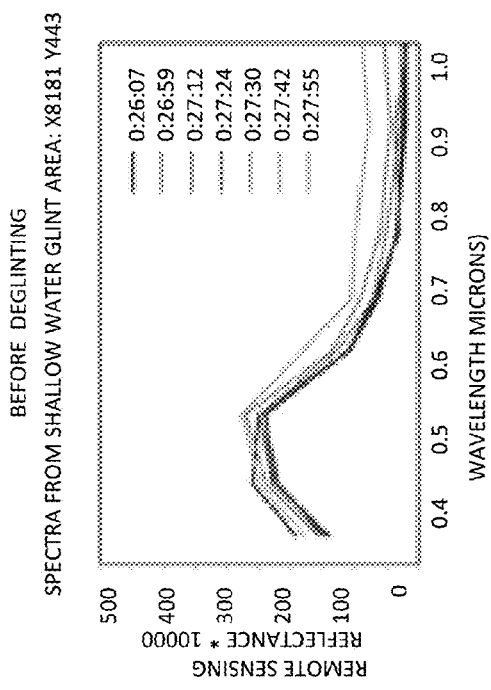
Figure 10H:
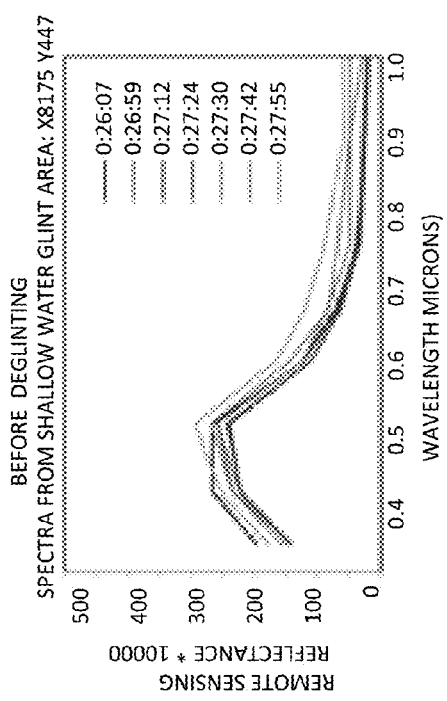

FIG. 10A-10H show the spectra (spectral reflectance versus wavelength) for four different pixels in the shallow water glint areas before and after deglinting according to the method described above and shown in FIG. 6. Each curve represents an image captured at a different time. Note in particular FIG. 10C and FIG. 10D. In FIG. 10C, the before-deglint image, the line 120 connects the reflectance of pixel X8250 Y424 in the image taken at 00:27:55. The line 121 shows a very high reflectance at all wavelengths compared to the reflectance of the same pixel in images captured at different times (00:26:07 through 00:27:42). As seen in FIG. 10D, which plots the after-deglint spectra of the same pixel, the spectra of that pixel in the 00:27:55 has been corrected to remove the NIR-glint components. Reductions in sun glint are also apparent in FIGS. 10B, 10F, and 10H.

Optionally, the image can be evaluated to determine whether it includes obvious bright, shallow water areas adjacent to deep dark water areas, and if so, to classify the image into a few classes of similar characteristics, and to process each class separately. When the image has visible sharp edges due to bottom type change and/or a rapid depth change, the NIR values may change sharply as well. In nature, clear deep waters have NIR values near zero but shallow waters can have a significantly non-zero NIR component due to light reflecting off the bottom. It can be desirable to only remove the glint while keeping the natural environmental NIR component that is due to the bottom. This can be particularly suitable for the very large WorldView-2 images of regions that include both coastal and deep water in the same image.

By separately processing the different classes, the average lowest 1% NIR values are calculated using only bright shallow water pixels to correct shallow water pixels and only dark deep water pixels to correct deep water pixels. Otherwise, at a channel break such as that seen in the lower right of these images, the processing steps shown in FIG. 6 calculate the average lowest 1% for the shallow pixels at the shelf break using the darker deep channel pixels, leading to an overestimation of the glint value for the shallow water pixels, potentially causing removal of the natural environmental NIR reflectance as well as the glint.

The corrected images obtained by the process described herein can be used for many purposes, including ocean search and rescue, imaging fish and marine mammals on or near the surface, surface or shallow water bottom mine detection, mapping surfactants, viewing underwater targets, viewing the ocean bottom, benthic surveying, locating navigational hazards, analysis of water content, and environmental monitoring.

The present method and system described herein individually corrects the MS1 and MS2 bands, thus accounting for the changing glint patterns caused by the 0.2 second time delay between data collection of the two band sets. This produces better results than other attempts to correct for specular reflection that assume NIR reflection from the water column is zero or near zero in a deep water area of the image and use a single NIR band as the reference for the correction across all bands.

It is noted that for the WorldView-2 and WorldView-3 imagery, the panchromatic band is collected at a different time offset at a time sometime between MS1 and MS2, and at a different resolution than the multi-spectral band arrays, so it has its own sun glint distribution that differs from both the MS1 and MS2 arrays. Therefore, the technique described herein is not used to correct for sunglint in the panchromatic band.

Embodiments of the invention comprises a computer program for image processing, which computer program embodies the functions, modules, and subsystems described herein. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention.

One of ordinary skill in the art will recognize that the methods, systems, and control laws discussed above with respect to image processing may be implemented in software as software modules or instructions, in hardware (e.g., a standard field-programmable gate array ("FPGA") or a standard application-specific integrated circuit ("ASIC"), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods and systems may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth example modes of the invention to describe the invention and to enable a person of ordinary skill in the art to make and use the invention. This written description does not limit the invention to the precise terms set forth. Thus, while the invention has been described in detail with reference to the examples set forth above, those of ordinary skill in the art may make alterations, modifications and variations to the examples without departing from the scope of the invention.

What is claimed as new and desired to be protected by Letters Patent of the United States is:

1. A computer implemented method for reducing sunglint effects in a multispectral digital image from a satellite multiband imager having a sampling time delay between collection of a first bandset and a second bandset, the first bandset including a first near infrared band and a plurality of other wavelength bands, the second bandset including a second near infrared band and a plurality of other wavelength bands,
   the digital image having a plurality of pixels, each pixel having a reflectance value in the first near infrared band, a reflectance value in each of the other wavelength bands in the first bandset, a reflectance value in the second near infrared band, and a reflectance value in each of the other wavelength bands in the second bandset, the method comprising:
   (a) initially masking land areas and areas obstructed by clouds or other objects in the multispectral digital image;
   (b) correcting the reflectance values in each of the other wavelength bands in the first bandset for each unmasked pixel in the image by
      extracting pixels in a window surrounding a current pixel,
      determining a local low glint value as the characteristic value of a small subset of pixels in the window having the lowest first bandset near infrared reflectance values,
      determining a near infrared glint value by subtracting the local low glint value from the first bandset near infrared reflectance value of the current pixel, and subsequently
      determining glint-corrected reflectance values for each of the other wavelength bands in the first bandset by subtracting the local low glint value from the reflectance value of each of the other wavelength bands in the first bandset;
   (c) correcting the reflectance values in each of the other wavelength bands in the second bandset for each unmasked pixel in the image by
      extracting pixels in a window surrounding a current pixel,
      determining a local low glint value as the characteristic value of a small subset of pixels in the window having the lowest second bandset near infrared reflectance values,
      determining a near infrared glint value by subtracting the local low glint value from the second bandset near infrared reflectance value of the current pixel, and
      determining glint-corrected reflectance values for each of the other wavelength bands in the second bandset by subtracting the local low glint value from the reflectance value of each of the other wavelength bands in the second bandset,
   said (b) and said (c) accomplished in parallel; and subsequently,
   (d) for each unmasked pixel in the image, storing the first bandset near infrared glint values, the second bandset near infrared glint values, the glint-corrected reflectance values for each of the other wavelength bands in the first bandset, and the glint-corrected reflectance values for each of the other wavelength bands in the second bandset.

2. The method according to claim 1, wherein the multispectral digital image from a satellite multiband imager is a WorldView-2 or WorldView-3 digital image.

3. The method according to claim 2, wherein the WorldView-2 digital image is an image digitally resampled using a nearest neighbor algorithm.

4. The method according to claim 1, wherein the multispectral digital image is part of a Geographic Tagged image file format (GeoTiff) or National Imagery Transmission Format (NITF) multispectral data file.

5. The method according to claim 1, wherein the corrected values for each of the wavelength bands are saved in an Environment for visualizing Images (ENVI) format computer data file.

6. The method according to claim 1, wherein said masking includes assigning a zero or null value to pixels within the masked areas.

7. The method according to claim 1, wherein the small subset of pixels in the window having the lowest near infrared reflectance values is between about 1% and about 2% of the pixels in the window.

8. The method according to claim 1, further comprising:
   increasing the window dimensions for pixels near an edge of the image or near a masked area until a total number of unmasked pixels in the window exceeds at least a predetermined fraction of a preset window size.

9. The method according to claim 8, wherein the predetermined fraction is 95%.

10. The method according to claim 1, wherein said determining a local low glint value further includes excluding from consideration pixels having a near infrared reflectance value outside three standard deviations from the mean near infrared reflectance of unmasked pixels in the window.

11. The method according to claim 1, further comprising: applying a single band near infrared subtraction correction to all bands of the first bandset and the second bandset for all the unmasked pixels.

12. The method according to claim 11, further comprising: storing, in a corrected image datafile associated with the image, values of corrected reflectance resulting from applying the single band near infrared subtraction correction.

13. The method according to claim 11, wherein said applying comprises determining a deep water near infrared reflectance value from a deep water area of the image, and subtracting the deep water near infrared reflectance value from all the reflectance values of all the bands of the first bandset and the second bandset for all the unmasked pixels.

14. The method according to claim 1, further comprising: classify the image into at least two regions of similar characteristics including a first region of clear deep water have a lower near infrared values and a second region of shallow waters having a higher near infrared component due to light reflecting off the bottom;

and wherein said steps (a), (b), (c) and (d) are accomplished separately for the at least two different regions.

15. The method according to claim 14, further comprising: receiving, by the computer processor, input from a user identifying the at least two different regions.

* * * * *